UNITED STATES PATENT OFFICE.

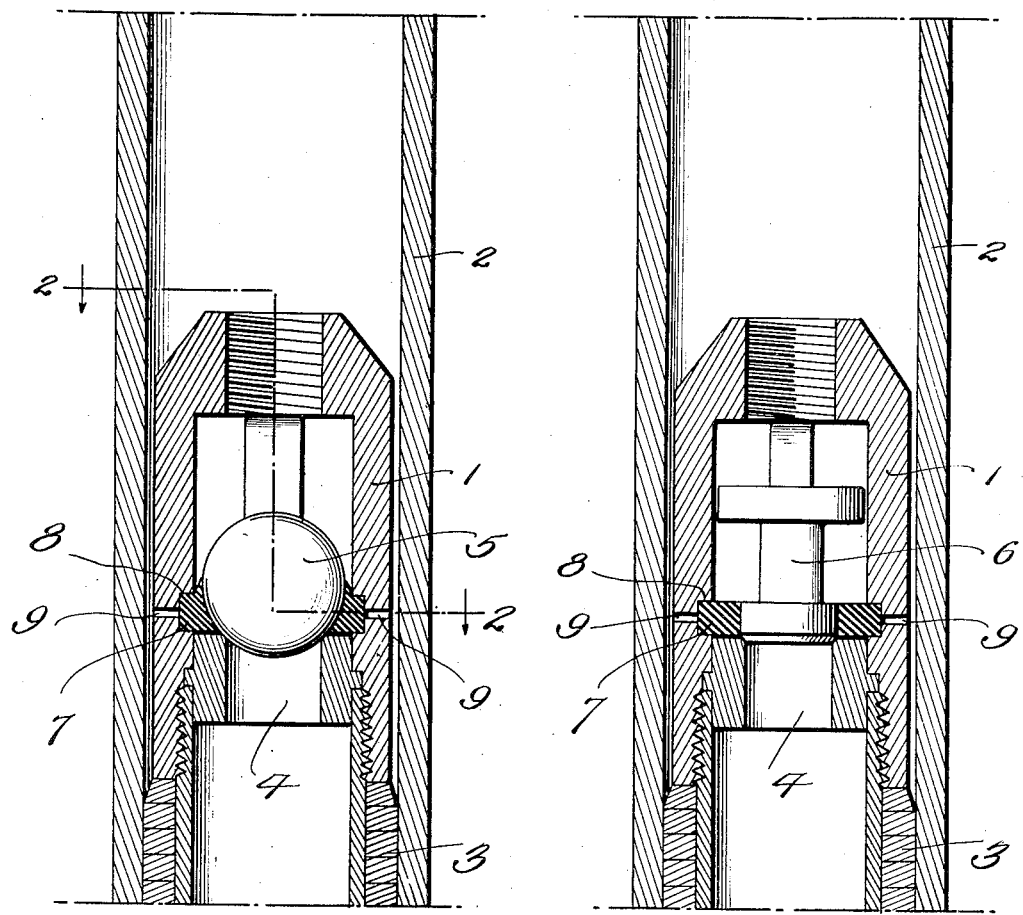
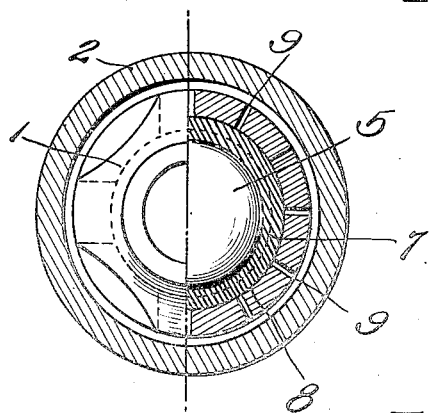

JAMES K. PUTNAM, OF TULSA, OKLAHOMA.

CHECK-VALVE.

1,380,415.          Specification of Letters Patent.          Patented June 7, 1921.

Application filed April 10, 1919. Serial No. 289,048.

*To all whom it may concern:*

Be it known that I, JAMES K. PUTNAM, citizen of the United States, residing at Tulsa, in the county of Tulsa and State of Oklahoma, have invented certain new and useful Improvements in Check-Valves; and I do declare the following to be a full, clear, and exact description of the invention, such as will enable others skilled in the art to which it appertains to make and use the same.

My invention relates to improvements in check valves and the present showing is intended principally for use upon deep well pumps at the points commonly occupied by the well known working valves, standing valves, etc. It is to be understood however that a check valve constructed in accordance with the invention may be employed at any point and in connection with any kind of pump, passageway, or the like, with which it may be advantageously used.

The invention relates more particularly to check valves employing a metal seat and metal valve body adapted to contact with said seat to entrap a quantity of liquid or fluid in a chamber, and since these valves are often inaccessible for grinding and repairing, a demand is felt for some form of seal which will prevent leakage between the valve body and seat, should either become worn; and it is the object of my invention to meet this demand by the provision of an elastic seal ring which is contracted by the weight or pressure of the liquid or fluid entrapped by the valve, whereby to snugly surround the valve body and form an effective seal between such body and the seat.

A further object is to provide for mounting the seal ring in a simple manner and for making novel provision for contracting said ring by the weight or pressure of the liquid or fluid.

With the foregoing in view, the invention resides in the novel features of construction and unique association of parts hereinafter fully described and claimed, the descriptive matter being supplemented by the accompanying drawing which forms a part of this application.

Figure 1 is a vertical section showing one form of check valve, constructed in accordance with my invention.

Fig. 2 is a sectional view on the line 2—2 of Fig. 1.

Fig. 3 is a vertical section of a different type of valve.

In the drawing above briefly described, the numeral 1 designates a valve cage adapted to be mounted in a pump casing 2 or to extend into any other chamber in which the liquid or fluid is to be trapped, and said cage may be of any suitable construction. When the cage is secured in a pipe casing such as that indicated in the drawing, the usual packers 2 will preferably be provided for this purpose.

Within the cage 1 is a seat ring 4 which is preferably removable as shown, and a globular valve body 5, (Figs. 1 and 2), a sliding valve body 6 (Fig. 3), or any other form of valve body may contact with said seat ring to trap liquid in the pump casing or other chamber. The valve body raises or otherwise moves from its seat when liquid or fluid is drawn or forced into the chamber and then is automatically closed in the usual way to prevent return of such liquid or fluid, and when the device is used for instance as a standing valve in a pump, the downward stroke of the piston exerts more or less of a downward pressure on the liquid. If the valve body and seat do not tightly engage, leakage takes place and due to the nature of the present invention, such leakage will be checked.

A seal ring 7 of freely yieldable rubber or other elastic material rests on the seat ring 4 and is adapted to snugly surround the valve body when it is in contact with its seat, and it will be seen by reference to Figs. 1 and 3, that the shape of the ring 7 may be varied in accordance with the type of valve body with which it is used. Also, the ring 7 might well be mounted in any suitable manner, but I prefer to provide the cage 1 with an internal circumferential channel 8 into which a peripheral portion of said ring is snapped and held by its own resiliency. A multiplicity of ports 9 extend through the cage 1, from the exterior of the latter into the channel 8 and it is by means of these ports that the pressure or weight of the liquid trapped in the casing 2 or other container, may act on the periphery of the elastic ring 7, thus snugly contracting the same around the valve body and serving to effectively prevent leakage between said body and its seat. The action of the liquid which tends to contract the ring 7, is released as soon as a force is exerted to open the valve, such for instance as the ascent of the usual pump piston, if the device be employed in a pump, and thus the usual operation of the valve is not impaired.

I am aware that check valves have heretofore been employed having seats of rubber and other yielding material and I lay no claim to such an arrangement, but in so far as I am informed, I am the originator of a seal between the ordinary metal valve body and seat, occupied by the force or pressure of the liquid or fluid entrapped by the valve.

Since the invention is not restricted to any specific details, it is to be understood that numerous minor changes may be made.

I claim:

In a check valve, a cage for reception in a liquid or fluid container, said cage having an annular internal valve seat and an annular internal channel having a side flush with said seat, a check valve for contact with the inner portion of said seat, and an elastic ring resting on said seat and held in said channel, said cage having a port into said channel permitting the pressure or weight of the trapped fluid or liquid to contract said elastic ring around said check valve.

In testimony whereof I have hereunto set my hand.

JAMES K. PUTNAM.

Witnesses:
 Wm. D. Godfrey,
 Inez L. Robinson.